United States Patent [19]

Hawley

[11] 4,345,055

[45] Aug. 17, 1982

[54] POLYMERIZATION WITH TITANIUM IMPREGNATED SILICA-CHROMIUM CATALYSTS

[75] Inventor: Gil R. Hawley, Bartlesville, Okla.

[73] Assignee: Phillips Petroleum Company, Bartlesville, Okla.

[21] Appl. No.: 265,477

[22] Filed: May 20, 1981

Related U.S. Application Data

[62] Division of Ser. No. 118,838, Feb. 6, 1980, Pat. No. 4,296,001.

[51] Int. Cl.³ .............................. C08F 4/02; C08F 4/24
[52] U.S. Cl. ....................................... 526/96; 252/451; 252/458; 526/106; 526/107; 526/352
[58] Field of Search .......................... 526/96, 106, 107

[56] References Cited

U.S. PATENT DOCUMENTS

| | | | |
|---|---|---|---|
| 3,622,521 | 11/1971 | Hogan et al. | 252/430 |
| 3,780,011 | 12/1973 | Pullukat et al. | 526/96 |
| 3,882,096 | 5/1975 | Shida et al. | 526/96 |
| 3,887,494 | 6/1975 | Dietz | 252/452 |
| 3,900,457 | 8/1975 | Witt | 526/106 |
| 3,970,613 | 7/1976 | Goldie et al. | 526/104 |
| 4,041,224 | 8/1977 | Hoff et al. | 526/96 |
| 4,169,926 | 10/1979 | McDaniel | 526/106 |
| 4,218,345 | 8/1980 | Hoff et al. | 252/458 |

FOREIGN PATENT DOCUMENTS

| | | |
|---|---|---|
| 1197069 | 7/1970 | United Kingdom . |
| 1369485 | 10/1974 | United Kingdom . |
| 1405721 | 9/1975 | United Kingdom . |
| 1447605 | 8/1976 | United Kingdom . |
| 1575419 | 9/1980 | United Kingdom . |

*Primary Examiner*—Stanford M. Levin

[57] ABSTRACT

In accordance with a first embodiment of this invention, a silica xerogel is aqueously impregnated with a titanium compound which is resistant to hydrolysis. In accordance with a second embodiment of this invention, a silica hydrogel containing a titanium compound resistant to hydrolysis is dried. In this embodiment, the hydrogel preferably also contains a pore preserving agent. This invention makes possible the use of aqueous impregnation of titanium and conventional drying techniques to give a catalyst having characteristics associated with azeotrope dried silica-titanium coprecipitated catalyst. The catalysts of this invention are useful in olefin polymerization processes, particularly in the polymerization of predominantly ethylene monomer systems under slurry conditions.

40 Claims, 5 Drawing Figures

MELT INDEX VS. REOXIDATION TEMP.
FOR R&R ACTIVATED CATALYST

FIG. 1

MELT INDEX VS. ACTIVATION TEMPERATURE
FIG. 2

MELT INDEX VS. WT % Ti
FIG. 3

MELT INDEX VS. REOXIDATION TEMP.
FIG. 4

MELT INDEX VS. WT. % Ti
FOR R&R ACTIVATED CATALYST

FIG. 5

POLYMERIZATION WITH TITANIUM IMPREGNATED SILICA-CHROMIUM CATALYSTS

CROSS REFERENCE TO RELATED APPLICATION

This is a divisional of copending application Ser. No. 118,838, filed Feb. 6, 1980, now U.S. Pat. No. 4,296,001.

BACKGROUND OF THE INVENTION

This invention relates to silica supported chromium catalysts containing titanium.

Supported chromium oxide catalysts have been used for many years in the polymerization of olefins to solid polymers. One widely used method of producing such catalysts involves precipitating a silica hydrogel, impregnating the hydrogel with an aqueous solution of a chromium compound and drying. Such procedure gives a silica which inherently has sufficient strength to resist severe shrinkage of the pores during simple drying techniques such as oven drying, tray drying, spray drying or drying under a heat lamp. Such catalyst is simple and inexpensive to produce and gives outstanding results in solution polymerization of olefins to give normally solid polymer.

There is an economic advantage in some instances to producing olefin polymers in a slurry as opposed to a solution system. However, certain control operations which are easily carried out in the solution process are considerably more difficult in the particle-form or slurry process. For instance, in the solution process, control of the molecular weight can be effected by changing the temperature, with lower molecular weight (higher melt flow) being obtained at the higher temperature. However, in the slurry process, this technique is inherently limited since any effort to increase the melt flow to any appreciable extent by increasing the temperature causes the polymer to go into solution and thus destroys the slurry process.

It is known that titanium affects the polymerization activity of silica supported chromium catalysts in a way that is of special importance in slurry polymerizations. However, when titanium is coprecipitated with the silica, it produces a hydrogel which does not have sufficient strength to resist serious collapse of the pores during simple drying such as spray drying. Accordingly, in order to take full advantage of the improvement which can be imparted to the melt index capability through the use of titanium in accordance with the prior art, the titanium had to be coprecipitated with the silica and the resulting hydrogel (cogel) dried by a more expensive azeotrope distillation or washing with a liquid oxygen-containing water soluble organic compound.

SUMMARY OF THE INVENTION

It is an object of this invention to provide a titanium-containing silica supported chromium catalyst which can be dried in a conventional manner and yet which exhibits the characteristics associated with azeotrope dried titanium-silica coprecipitated catalysts.

It is a further object of this invention to provide a catalyst suitable for use in slurry polymerization systems; and It is yet a further object of this invention to provide an improved olefin polymerization process.

There are two embodiments to this invention. In accordance with the first embodiment of this invention, a silica xerogel is aqueously impregnated with a titanium compound which is resistant to hydrolysis.

In accordance with the second embodiment of this invention, a silica hydrogel containing a titanium compound resistant to hydrolysis is dried; in this embodiment, the hydrogel preferably also contains a pore preserving agent.

BRIEF DESCRIPTION OF THE DRAWINGS

In the drawings, forming a part hereof.

DESCRIPTION OF THE PREFERRED EMBODIMENTS

EMBODIMENT 1

In this embodiment, a dried silica hydrogel (xerogel) is impregnated with an aqueous solution of a hydrolysis resistant titanium compound. In this embodiment, the xerogel can be formed by drying a titanium free hydrogel by conventional means. For instance, an alkali metal silicate can be added to an acid to produce a hydrogel which is washed to remove alkali metal ions, impregnated with an aqueous solution of a chromium compound and thereafter dried in a conventional manner such as spray drying. The silica hydrogel can be prepared in a conventional manner, for instance, by contacting an aqueous acid solution with an aqueous solution of an alkali metal silicate as disclosed in Witt, U.S. Pat. No. 3,900,457, issued Aug. 19, 1975, the disclosure of which is hereby incorporated by reference. Preferably, the alkali metal silicate is added to the acid.

Other conventional drying techniques such as air oven drying, tray drying, vacuum oven drying or drying under a heat lamp or other radiant heat source can be used. Conventional drying temperatures of room temperature to 425° C. or higher can be used to thus remove free water and produce a xerogel. With spray drying the incoming air can be up to 425° C. although the catalyst does not get that hot.

Thereafter, the resulting xerogel is impregnated with an aqueous solution of a hydrolysis resistant titanium compound. A hydrolysis resistant, water soluble titanium compound is required since otherwise titanium precipitates out independently of the silica. When titanium compounds outside the scope of the hydrolysis resistant titanium compounds of this embodiment of this invention are used, polymers made with the resulting catalyst do not exhibit the superior stress crack resistance shown by polymers made through the use of the catalyst of this embodiment of this invention.

The hydrolysis resistant titanium compounds are preferably selected from titanium chelates, particularly alkanolamine titanates, e.g., triethanolamine titanate. The titanium chelates are known compounds and can be expressed by the general formula:

where R is an alkyl group containing from 1 to about 4 carbon atoms, A is a functional group containing O or N or is OH, and B is a divalent hydrocarbon chain of 2 or 3 carbon atoms which can have one or more alkyl groups of 1 to about 4 carbon atoms. An example of a specific compound is triethanolamine titanate chelate. Triethanolamine titanium chelate has the formula

This is available from DuPont under the designation Tyzor TE.

Lactic acid titanium complexes such as lactic acid titanium chelates and tetraoctylene glycol titanium complexes such as tetraoctylene glycol titanium chelates are also suitable. A specific example of a lactic acid titanium complexes is:

This is available from DuPont under the designation Tyzor LA.

An example of the tetraoctylene glycol titanium complexes is:

$$Y = -CH_2\overset{C_2H_5}{\underset{C_3H_7}{CHCH-}}$$

This is available from DuPont under the designation Tyzor OG.

It must be emphasized that the invention is applicable only to the hydrolysis resistant compounds of the general formula. The three classes of titanium chelates set out hereinabove are hydrolysis resistant. One class, the titanium acetyl acetonates are not and hence cannot be used in this invention. A simple test can be used to determine if a compound is suitable for use in this invention, namely to mix the compound with water. If a precipitate forms, it is not suitable and if no precipitate forms, it is suitable.

The resulting titanium impregnated xerogel can then be activated without further processing especially if only enough solution is used to just fill the pores. Alternatively, the water can be removed by evaporation at room temperature or an elevated temperature of about 100° to 250° C. or higher prior to the activation.

The activation can be carried out in a conventional manner by calcining at an elevated temperature, generally from about 400° C. to 1100° C. in a dry atmosphere containing oxygen, generally in air. Alternatively, the catalyst can be activated in accordance with the reduction/reoxidation procedures disclosed in McDaniel and Welch, U.S. Pat. No. 4,151,122, which issued Apr. 24, 1979, the disclosure of which is hereby incorporated by reference. Use of this activation technique further enhances the capability to produce high melt index polymers exhibiting superior stress crack resistance.

The final titanium concentration will be such as to give 0.1 to 10 preferably 3-7 weight percent titanium based on the weight of the activated catalyst.

EMBODIMENT 2

In this embodiment, a hydrolysis resistant titanium compound as described in embodiment 1 is incorporated into a hydrogel which is then dried. Conventional techniques as described hereinabove, such as spray drying, oven drying, tray drying, or drying under a heat lamp or other radiant heat source can be used. In this embodiment, it is preferred that the hydrogel further contain a pore preserving agent as described hereinbelow although this is not essential. The resulting titanium-containing xerogel is then activated by calcining as described hereinabove. While the hydrolysis resistant titanium compound can be coprecipitated with the hydrogel, it is preferably added to the hydrogel neat or as a solution in an organic solvent such as isopropanol which is miscible with water. This is because it is normally stored in this form. Alternatively just before using, the hydrolysis resistant titanium compound could be dissolved in water.

The final titanium compound concentration will be such as to give about 0.1 to 10, preferably 2 to 10, more preferably 2-6 percent titanium based on the weight of the activated catalyst.

After the activation step in all of the embodiments, at least a portion of the chromium compound is in the hexavalent state.

In all embodiments, the chromium component of the catalyst can be coprecipitated with the silica or added by means of an anhydrous solution to the xerogel but preferably the chromium is introduced by means of incorporating an aqueous solution of a water soluble chromium compound with the hydrogel. This is preferably done after the hydrogel is washed with water to remove alkali metal ions. The water soluble chromium compound can be selected from among chromium acetate, chromic nitrate, chromic sulfate, chromous sulfate, chromium trioxide, ammonium chromate, and other soluble chromium compounds. Chromium acetate and $CrO_3$ are preferred.

In all of the embodiments, the amount of chromium compound employed in making the catalyst is sufficient to provide from about 0.001 to about 10 weight percent, preferably 0.1 to 5 weight percent chromium in the final catalyst based on the weight of the activated catalyst.

The silica pore structure preserving agents, when used, can be selected from among organic silicon compounds, e.g., triarylsilanols, described in application Ser. No. 914,258, filed June 9, 1978, now U.S. Pat. No. 4,190,457, the disclosure of which is hereby incorporated by reference; oxygen-containing organic compounds selected from among polyhydric alcohols, mono- and dialkyl ethers of ethylene glycol and poly(alkylene)glycol as disclosed in McDaniel, U.S. Pat. No. 4,169,926, issued Oct. 2, 1979, the disclosure of which is hereby incorporated by reference and surfactants. U.S. Pat. No. 4,169,926 also discloses suitable anionic, cationic and nonionic surfactants. This patent also discloses combinations of the oxygen-containing organic compounds with a normally liquid hydrocarbon, e.g., n-heptane, kerosene, and, optionally, a surfactant, which are also suitable pore preserving agents. The nonionic surfactants are preferred.

The pore preserving agents can also include certain inorganic and organic acids used at a specific level of pH. Specifically the hydrogel is contacted with an inorganic or organic acid in an amount sufficient to impart to the mixture a pH ranging generally from about 0 to about 3.5, more specifically from about 0 to 3. About 2.2 or below is presently preferred.

Inorganic acids employable in this invention are those which are water soluble, sufficiently ionized to produce the pH level required in the hydrogels, and do not have a deleterious effect on the silica or in the end use application. For the production of ethylene polymerization catalysts, specific but nonlimiting acids can be selected from among hydrochloric acid, hydrobromic acid, hydriodic acid, nitric acid, sulfamic acid, sulfuric acid, orthophosphoric acid and iodic acid.

Organic acids generally employable in this invention are those which exhibit the same requirements as the inorganic acids. Specific but nonlimiting examples include acetic acid, formic acid, tartaric acid, citric acid, maleic acid, malic acid, malonic acid, succinic acid, gluconic acid, diglycolic acid, ascorbic acid, cyclopentane tetracarboxylic acid, and benzenesulfonic acid.

In general, those organic acids meeting the requirements of water solubility, stability, acid strength, nondeleterious action as described before also have pK values of about 4.76 or less as disclosed in Lange's Handbook of Chemistry, 11th Edition (1973), Tables 5-7, 5-8. In other words their acid strength is equal to or greater than that of acetic acid.

Acids such as sulfuric acid and hydrochloric acid are generally preferred, however, because of their ready availability, relatively low cost, great acid strength, and efficacy in the process.

The pore preserving agent can be incorporated in one of the ingredients used to make the silica hydrogel, however, it is preferably incorporated into the hydrogel after the washing step since this avoids loss of the agent during the washing step.

When the pore preserving agent is an oxygen-containing organic compound, the weight ratio of oxygen-containing organic compound to hydrogel employed in making the catalyst can range from about 5:1 to about 0.5:1.

When both an oxygen-containing organic compound and a normally liquid hydrocarbon are employed with the hydrogel, the weight ratio of hydrocarbon to organic compound can vary from about 20:1 to about 0.5:1.

When employing one or more surfactants with the hydrocarbon/oxygen-containing organic compound, generally about 0.1 to about 5 weight percent surfactant is used based on the weight of hydrocarbon/oxygen-containing organic compound.

When a surfactant or an organic silicon compound of said Ser. No. 914,258 is employed as the silica pore structure preserving agent, the weight ratio of hydrogel to surfactant or organic silicon compound can range from about 20:1 to about 500:1, preferably from about 40:1 to about 100:1.

Sufficient treating time is allotted to obtain contact of the various added components with the hydrogel or dried gel. Generally, times ranging from about 30 seconds to about 10 hours, preferably 15 minutes to 120 minutes are adequate. The treated hydrogel is then dried as described above to remove the liquids and the composite is then activated at an elevated temperature.

Specific examples of preferred pore preserving agents are a polysiloxane-polyoxyalkylene copolymer, a polyethoxylated sorbitol monolaurate, and a polyethoxylated t-octylphenol.

The catalyst of this invention resembles coprecipitated silica-titania catalyst in pore volume, in chromium content, and in the titanium content although the process for making the catalyst is substantially simplified and substantially less expensive.

The catalyst of this invention can be used to polymerize at least one mono-1-olefin containing 2 to 8 carbon atoms per molecule. The invention is of particular applicability in producing ethylene homopolymers and copolymers from mixtures of ethylene and one or more comonomers selected from 1-olefins containing 3 to 8 carbon atoms per molecule. Exemplary comonomers include aliphatic 1-olefins such as propylene, 1-butene, 1-hexene, and higher 1-olefins and conjugated or non-conjugated diolefins, such as 1,3-butadiene, isoprene, piperylene, 2,3-dimethyl-1,3-butadiene, 1,4-pentadiene, 1,7-hexadiene, and mixtures thereof. Ethylene copolymers preferably constitute at least about 90, more preferably 95 to 99 mole percent polymerized ethylene units. Ethylene, propylene, 1-butene, and 1-hexene are especially preferred.

The polymers can be prepared from the catalyst of this invention by solution polymerization, slurry polymerization, and gas phase polymerization technique using conventional equipment and contacting processes. However, the catalyst of this invention is particularly suitable in slurry polymerizations for the production of high melt index polymers in the absence of molecular weight modifiers, such as hydrogen. The slurry process is generally carried out in an inert diluent such as a paraffin, aromatic or cycloparaffin hydrocarbon. For predominantly ethylene polymers, a temperature of about 66° to 110° C. is employed. Hydrogen or other molecular weight modifiers can be used, of course, if desired. Also conventional cocatalysts and adjuvants and activators can be utilized, if desired.

activated, it contained 3 percent Ti, 1 percent Cr by weight).

2. Co-impregnation of Davison 952 Silica Gel with Aqueous Chromium (III) Acetate and Tyzor TE Aqueous solutions containing the appropriate amounts of chromium acetate and Tyzor TE were prepared at the indicated temperature and diluted with demineralized water to volumes which would be nearly absorbed by the pore structure of weighed amounts of grade 952 silica gel. The solutions were placed in a large evaporating dish and the preweighed silica gel then added, resulting in deep green slurries which were then dried until free flowing by heating the evaporating dish on a large heating mantle. Catalysts prepared in this manner were blue-green in color, and when activated ranged from 0–6 percent Ti, and were about 0.8 percent Cr by weight.

| Table | Ref.[1] No. | Wt. Cr (OAc)$_3$ (g) | Tyzor TE[2] (ml) | Temp. °C. | Total Vol. Water (ml) | Wt. Silica gel (g) | Wt.[3] % Cr | Wt.[3] % Ti | Wt.[4] % Ti |
|---|---|---|---|---|---|---|---|---|---|
| III | 1–3 | 5.51 | 0 | R.T. | 600 | 144 | 0.87 | 0 | 0 |
| IV | 1–4 | | | | | | | | |
| III | 4–6 | 5.90 | 18.7 | 22 | 516 | 155 | 0.86 | 1.07 | 1 |
| IV | 5–8 | | | | | | | | |
| III | 7–9 | 5.70 | 54.0 | 23 | 500 | 150 | 0.84 | 2.95 | 3 |
| IV | 9–11 | | | | | | | | |
| III | 10–12 | 7.27 | 114 | 19 | 633 | 190 | 0.84 | 4.46 | 5 |
| IV | 12–15 | | | | | | | | |
| III | 13–15 | 5.74 | 126 | 22 | 500 | 150 | 0.82 | 6.26 | 7 |
| IV | 16–18 | | | | | | | | |

Titanated Catalyst A Preparations

[1] Catalyst for the indicated runs in the indicated Table III or Table IV.
[2] Spec: Gravity = 1.06, 8.3% Ti by weight.
[3] Determined by analysis.
[4] Calculated values.

EXAMPLE I

This exemplifies Embodiment 1 of this invention.

A. Catalyst Preparation: Aqueously titanated catalysts were prepared in two ways.

1. Aqueous Titanation of Catalyst A

Catalyst A was made by spray drying a silica hydrogel having 20 weight percent solids and containing an aqueous solution of chromium acetate sufficient to give 1 weight percent chromium in the final dried catalyst, said catalyst containing about 0.1 weight percent alumina. To 122 grams of Catalyst A was added 44 g Tyzor TE (DuPont's triethanolamine titanium chelate, 8.3 percent Ti in 150 ml of demineralized water). The resulting dry-appearing catalyst was bottled and labeled reference no. 1-4 for Table I and 1-23 for Table II (when B. Catalyst Activations: Air activated catalysts were heated for five hours under fluidizing conditions (42 std. l./hr.) at temperatures ranging from 704° to 816° C. Reduction/reoxidation activated-catalysts were heated to 871° C. in an atmosphere of 5% CO in $N_2$ under fluidizing conditions, held at this temperature for 4 hours, then reduced to the indicated reoxidation temperatures in $N_2$, and air oxidized for 2 hours.

C. Polymerization Reactions: Polymerizations were run in a two liter stirred, stainless steel autoclave reactor at 3.89 MPa ethylene using isobutane as a diluent. Reactions were run to 5,000 g/g productivity at temperatures ranging from 99° to 110° C. MI potentials were determined from polymer fluff at 190° C.

D. Results

1. Aqueous Titanation of Catalyst A

Table I contains data comparing the invention Catalyst A to the untitanated Catalyst A under standard air activation conditions. Both catalysts showed the usual increase in MI potential with both increased activation temperature, and increased polymerication temperature. The titanated catalyst however had considerably higher MI potentials under all conditions tested. Shear response was also higher in all cases for polymers prepared from the titanated catalysts. Titanation did not appear to affect activity under these activation and polymerization conditions.

TABLE I

Air Activated Catalyst A Aqueously Impregnated With 3% Ti as Tyzor TE

| Reference Number | Wt. % Ti | Activation Temp., C. | Polymerization Temp., C. | MI[1] | HLMI/MI | Induction Time (min) | Run Time (min.) | Productivity (g/g) | Color | Pore Volume cm$^3$/g | Surface Area m$^2$/g | Weight % Cr(VI) |
|---|---|---|---|---|---|---|---|---|---|---|---|---|
| 1 | 3 | 704 | 107 | 0.43(0.43) | 75 | 14 | 77 | 4920 | Orange | 1.51 | 290 | 1.04 |
| 2 | 3 | 704 | 110 | 1.07(1.12) | 51 | 30 | 87 | 4800 | Orange | 1.51 | 290 | 1.04 |
| 3 | 3 | 816 | 107 | 0.74(0.76) | 67 | 39 | 72 | 4830 | Green | 1.45 | 263 | 0.58 |
| 4 | 3 | 816 | 110 | 1.55(1.50) | 49 | 23 | 83 | 5180 | Green | 1.45 | 263 | 0.58 |
| 5 | 0 | 704 | 107 | 0.25(0.25) | 77 | 33 | 67 | 5030 | Yellow/Tan | 1.77 | 308 | 1.07 |
| 6 | 0 | 704 | 110 | 0.67(0.67) | 52 | 31 | 83 | 5010 | Yellow/Tan | 1.77 | 308 | 1.07 |
| 7 | 0 | 816 | 107 | 0.48(0.49) | 68 | 30 | 57 | 4950 | Green | 1.71 | 282 | 0.77 |
| 8 | 0 | 816 | 110 | 1.15(1.19) | 50 | 33 | 64 | 4820 | Green | 1.71 | 282 | 0.77 |

[1]Corr. to 5000 g/g prod.
Values in parentheses are uncorrected.

The titanated catalyst responded very well to reduction/reoxidation activation. Table II contains data describing results obtained from a variety of activation and polymerization conditions. All catalysts were CO reduced at 87° C. for 4 hours, and reoxidized at temperatures ranging from 482° to 816° C. Polymerization reactions were run without hydrogen to 5,000 g/g pro- Catalyst activity was somewhat improved by the presence of titanium. Catalyst samples reoxidized at 649° C. and above had very short induction periods, and reaction times 1 to 5,000 g/g productivity, comparable to or shorter than those of the air activated catalyst A samples.

2. Aqueous Titanation of 952 Silica Gel

TABLE II

Reduction/Reoxidation Activated Catalyst A Aqueously Impregnated with 3% Ti as Tyzor TE

| Reference Number | Reoxidation Temp., C. | Polymerization Temp., C. | MI[1] | HLMI/MI | Induction Time (min) | Run Time (min.) | Productivity (g/g) | Color | Pore Volume cm$^3$/g | Surface Area m$^2$/g | Wt. %[2] Cr(VI) |
|---|---|---|---|---|---|---|---|---|---|---|---|
| 1 | 482 | 99 | 1.42(1.37) | 98 | 10 | 79 | 5190 | Green | 1.42 | 255 | 0.30 |
| 2 | 482 | 102 | 2.41(2.27) | 88 | 10 | 89 | 5300 | | | | |
| 3 | 482 | 104.5 | 4.74(5.02) | 68 | 10 | 130 | 4730 | | | | |
| 4 | 482 | 107 | 6.71(7.09) | 58 | 10 | 123 | 4770 | | | | |
| 5 | 538 | 99 | 2.76(2.46) | 92 | 39 | 140 | 5610 | Green/Tan | 1.46 | 268 | (0.07) |
| 6 | 538 | 102 | 3.4 (3.63) | 82 | 10 | 80 | 5390 | | | | |
| 7 | 538 | 104.5 | 5.8 (5.70) | 65 | 10 | 120 | 5290 | | | | |
| 8 | 538 | 107 | 8.8 (8.39) | 61 | 70 | 120 | 5230 | | | | |
| 9 | 593 | 102 | 0.74(0.67) | 102 | 49 | 89 | 5350 | Green/Tan | 1.44 | 282 | (0.05) |
| 10 | 593 | 104.5 | 0.87(0.81) | 104 | 10 | 106 | 5350 | | | | |
| 11 | 593 | 107 | 1.62(1.54) | 79 | 21 | 90 | 5250 | | | | |
| 12 | 649 | 102 | 0.79(0.74) | 96 | 0 | 50 | 5370 | Green/Tan | 1.19 | 280 | 0.63 |
| 13 | 649 | 104.5 | 1.29(1.21) | 87 | 0 | 55 | 5350 | | | | |
| 14 | 649 | 107 | 1.53(1.62) | 83 | 10 | 70 | 4730 | | | | |
| 15 | 704 | 102 | 0.23(0.22) | 131 | 0 | 70 | 5300 | Yellow/Tan | 1.45 | 282 | 0.83 |
| 16 | 704 | 104.5 | 0.31(0.31) | 100 | 3 | 90 | 5020 | | | | |
| 17 | 704 | 107 | 0.76(0.75) | 73 | 15 | 60 | 5090 | | | | |
| 18 | 760 | 102 | 0.12(0.13) | 153 | 10 | 65 | 4730 | Yellow/Tan | 1.43 | 283 | 0.76 |
| 19 | 760 | 104.5 | 0.23(0.23) | 131 | 10 | 49 | 4970 | | | | |
| 20 | 760 | 107 | 0.59(0.62) | 75 | 10 | 58 | 4800 | | | | |
| 21 | 816 | 102 | 0.12(0.14) | 135 | 14 | 74 | 4470 | Green | 1.43 | 265 | 0.65 |
| 22 | 816 | 104 | 0.26(0.26) | 110 | 10 | 75 | 5030 | | | | |
| 23 | 816 | 107 | 0.57(0.59) | 77 | 10 | 59 | 4810 | | | | |

Figure 1:
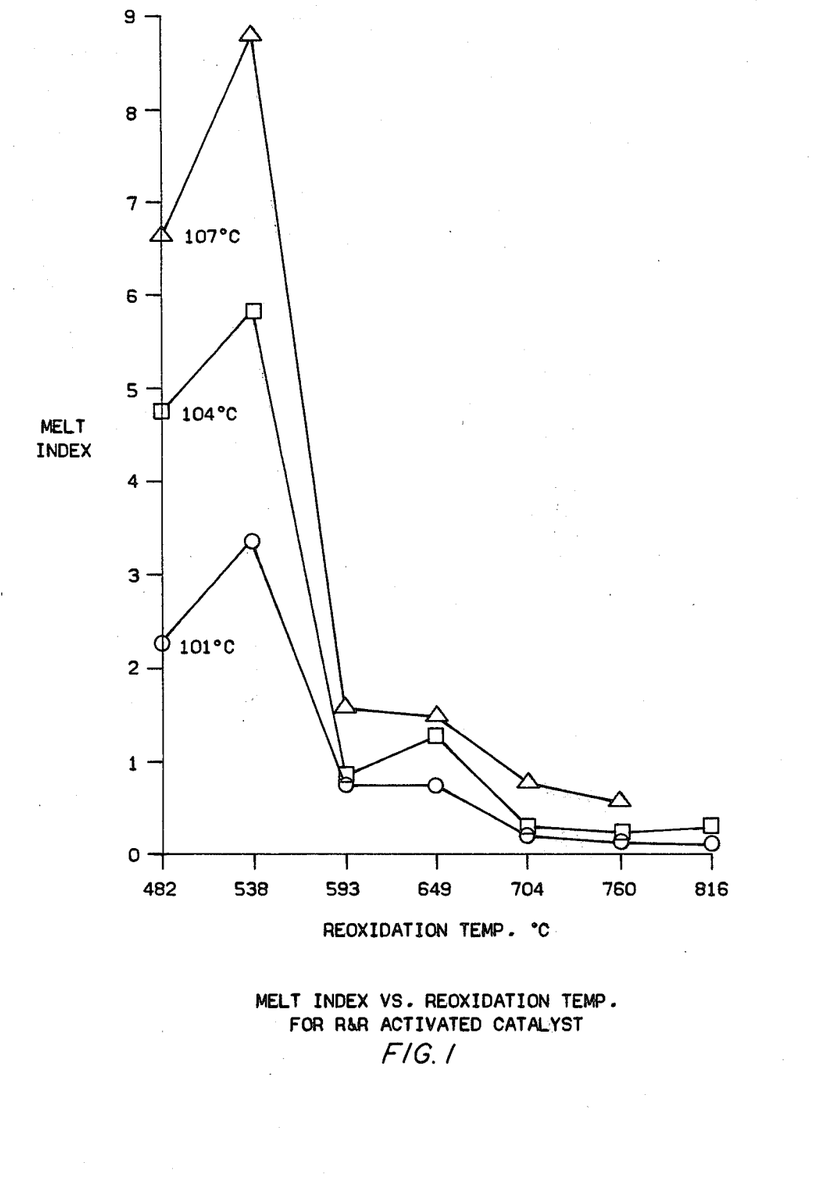
FIG. 1 is a plot of melt index versus reoxidation temperature for reduced and reoxidized activated Catalyst A as defined hereinafter which had been aqueously impregnated with 3 weight percent titanium as Tyzor TE, the polymerization temperature being indicated on the graph (Tyzor TE, is a product of E. I. duPont de Nemours & Co., Inc., Wilmington, DE)

[1]Corrected to 5000 g/g productivity, values in parentheses are uncorrected.
[2]Values in parentheses are believed to be invalid and have not been redetermined.

ductivity at temperatures ranging from 99° to 107° C. Under these experimental conditions, polymers were produced which ranged in melt index from 8.8 to 0.1. The maximum melt index potential was achieved when reoxidation occurred at 538° C. The MI potential of the reduction/reoxidation activated catalyst dropped off sharply with increased reoxidation temperature (FIG. 1).

All polymers produced by the titanated catalyst had unusually broad molecular weight distributions (indicated by high HLMI/MI ratio when compared to polymers made from Catalyst A.

Figure 2:
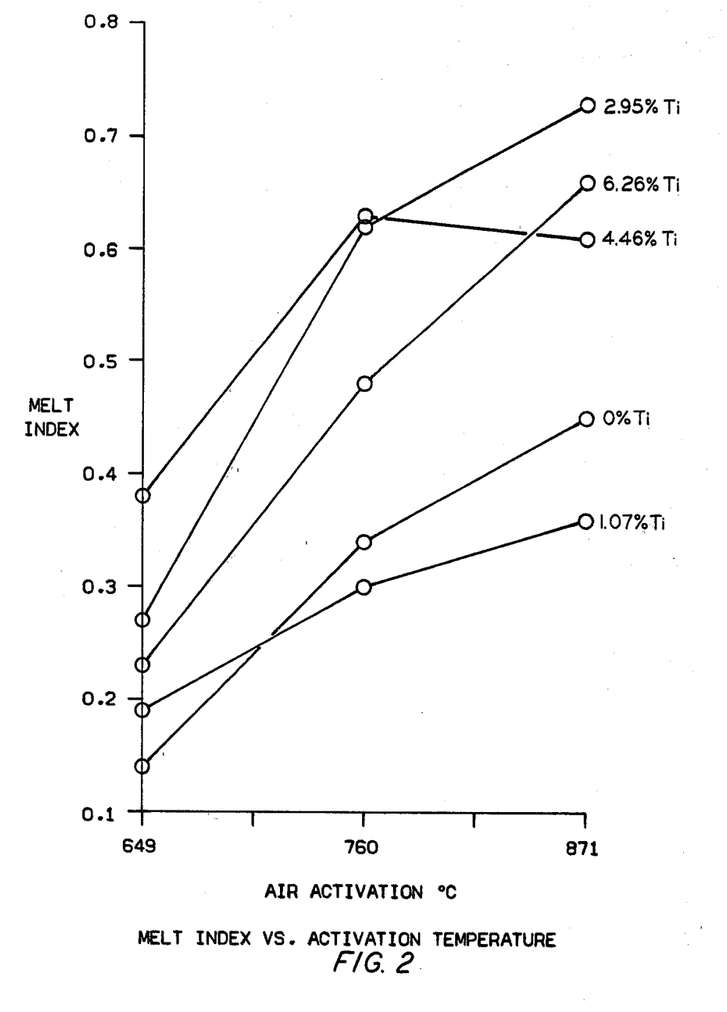
FIG. 2 is a plot of melt index versus air activation temperature for catalyst prepared by aqueously impregnating 952 silica gel with 1 weight percent chromium as chromium (III) acetate $(Cr(OAc)_3)$ and the indicated percentage titanium with Tyzor TE, using a polymerization temperature of 107° C. (952 silica, is a product of Davison Chemical Co.)
Figure 3:
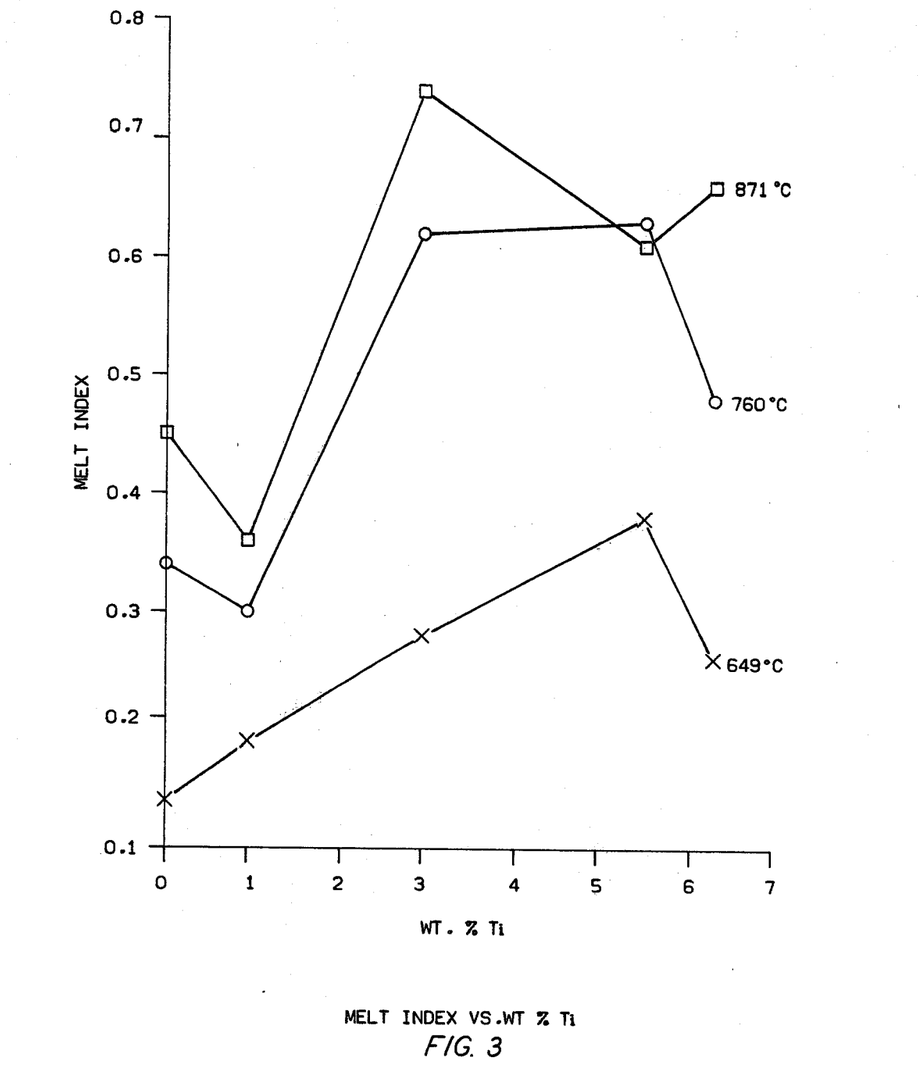
FIG. 3 is a plot of melt index versus weight percent titanium for catalyst prepared by aqueously impregnating 952 silica gel with 0.8 weight percent chromium as $Cr(OAc)_3$ and with the indicated weight percentage titanium as Tyzor TE., the catalyst being air activated at the indicated temperatures (polymerization temperature 107° C.)

Table III contains data illustrating the effects of titanium levels on MI potentials of air activated catalysts. FIG. 2 shows that for a given Ti level, MI potentials generally increased with increased activation temperature. It appeared that about 2 percent, preferably 3 percent or more titanium was necessary to achieve substantial MI potential improvements. Titanium levels of 3 to 5 percent resulted in the highest MI potentials at all activation temperatures. FIG. 3 shows that at lower activation temperatures the maximum MI potential is obtained at higher titanium levels. A catalyst containing 5.5 percent Ti activated at 649° C. (1200° F.) was superior in MI potential to the control catalyst activated at 760° C. (1400° F.).

TABLE III

Air Activated 952 Catalyst Aqueously Impregnated With Cr(OAc)₃ and Tyzor Te

| Reference Number | Wt. % Ti | Activation Temp. C. | MI¹ | HLMI/MI | Induction Time (min) | Run Time (min.) | Productivity (g/g) | Color | Pore Volume cm³/g | Surface Area m²/g | Wt. % Cr(VI) |
|---|---|---|---|---|---|---|---|---|---|---|---|
| 1 | 0 | 649 | 0.14(0.14) | 81 | 48 | 83 | 4880 | Orange | 1.66 | 303 | 0.83 |
| 2 | 0 | 760 | 0.34(0.32) | 78 | 38 | 57 | 5380 | Orange | 1.61 | 322 | 0.81 |
| 3 | 0 | 871 | 0.45(0.45) | 89 | 20 | 47 | 5000 | Tan | 1.51 | 285 | 0.69 |
| 4 | 1.07 | 649 | 0.19(0.18) | 71 | 62 | 93 | 5150 | Orange | 1.54 | 271 | 0.76 |
| 5 | 1.07 | 760 | 0.30(0.29) | 78 | 34 | 63 | 5210 | Orange | 1.50 | 2.97 | 0.73 |
| 6 | 1.07 | 871 | 0.36(0.33) | 101 | 25 | 56 | 5390 | Tan/Green | 1.41 | 262 | 0.59 |
| 7 | 2.95 | 649 | 0.27(0.26) | 74 | 62 | 125 | 5310 | Orange | 1.51 | 282 | 0.78 |
| 8 | 2.95 | 760 | 0.62(0.58) | 73 | 35 | 70 | 5420 | Orange | 1.47 | 300 | 0.70 |
| 9 | 2.95 | 871 | 0.73(0.71) | 74 | 41 | 75 | 5140 | Tan/Yellow | 1.33 | 244 | 0.61 |
| 10 | 4.46 | 649 | 0.38(0.38) | 74 | 10 | 69 | 5040 | Orange | 1.43 | 298 | 0.73 |
| 11 | 4.46 | 760 | 0.63(0.71) | 74 | 10 | 71 | 4440 | Orange | 1.39 | 281 | 0.71 |
| 12 | 4.46 | 871 | 0.61(0.56) | 89 | 10 | 63 | 5460 | Orange/Yellow | 1.27 | 243 | 0.61 |
| 13 | 6.26 | 649 | 0.26(0.28) | 78 | 12 | 91 | 4670 | Orange | 1.39 | 298 | 0.64 |
| 14 | 6.26 | 760 | 0.48(0.50) | 77 | 10 | 71 | 4740 | Orange | 1.37 | 286 | 0.60 |
| 15 | 6.26 | 871 | 0.66(0.67) | 83 | 15 | 66 | 4950 | Orange | 1.22 | 250 | 0.53 |

¹Corrected to 5000 g/g productivity, run at 107° C.
Values in parentheses are uncorrected.

Figure 4:
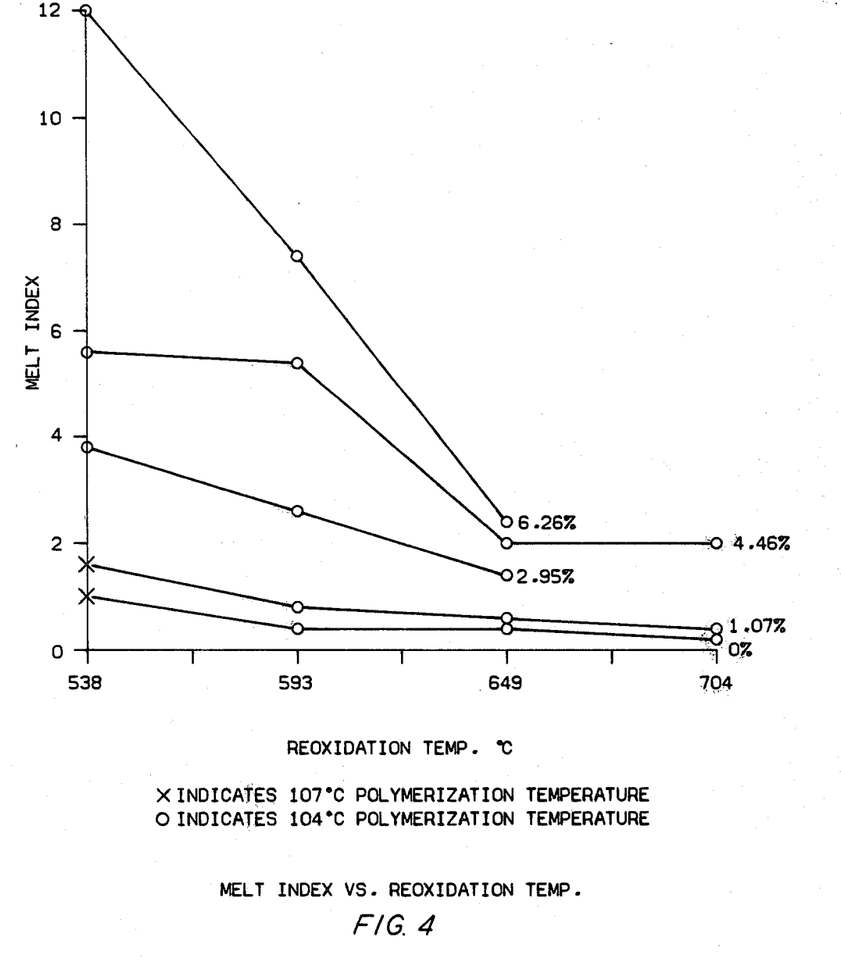
FIG. 4 is a plot of melt index versus reoxidation temperature for reduced and reactivated catalysts prepared by aqueously impregnating 952 silica gel with 0.8 weight percent chromium as $Cr(OAc)_3$ and with the indicated percentage titanium as Tyzor TE (polymerization temperature 104° C., except as indicated where the temperature was 107° C.)
Figure 5:
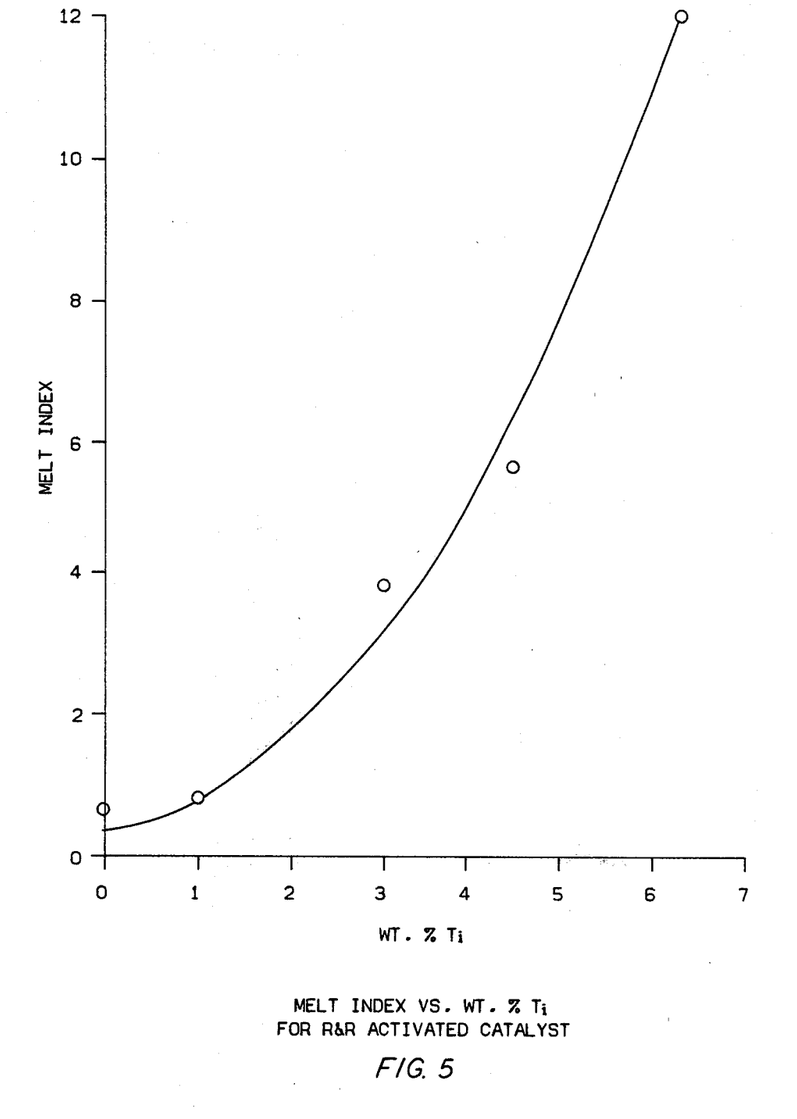
FIG. 5 is a plot of melt index versus weight percent titanium for reduced and reoxidized activated catalysts prepared by aqueously impregnating 952 silica gel with 0.8 weight percent chromium as $Cr(OAc)_3$ and with the indicated percentage titanium as Tyzor TE, the catalysts being CO reduced at 871° C. and reoxidized to 538° C. (polymerization temperature 104° C.).

The results of several reduction/reoxidation activations are in Table IV. In FIG. 4, MI potentials are plotted as a function of reoxidation temperature for catalysts containing 0.0 to 6.5 percent Ti by weight. Again maximum MI potentials were achieved at 538° C. reoxidation temperature, however, it did not appear that the MI potential dropped off as sharply with increased reoxidation temperature compared to the titanated finished Type A catalyst (compare FIGS. 1 and 4). FIG. 5 more clearly shows the effect of titanium content on melt index. Increased titanium content dramatically increased MI potentials, MI's as high as 12 were obtained with a 6.5 percent Ti catalyst run at 104° C. without hydrogen. All polymers made from the reduction/reoxidation activated catalysts had higher than usual shear response.

sufficient aqueous chromium trioxide solution to provide 1 weight percent chromium based on the dry composite, a titanium compound, when employed, and 3 volume percent of a liquid surfactant based on the hydrogel, when used. Each mixture was then dried overnight, about 16 hours, in an air oven maintained at 130° C. The dry products of runs 1–5 were individually activated by calcination in a 46 mm diameter quartz tube under fluidizing conditions with dry air at 760° C. for 5 hours. Each recovered sample was stored in a stoppered bottle in a dry atmosphere until ready for further use. The liquid surfactant (except for run 7) was a commercially available organosilicone-based nonionic material sold as L-5340 by the Union Carbide Corp., 270 Park Ave., New York, NY. The surfactant is believed to be a polysiloxane-polyoxyalkylene copolymer.

TABLE IV

Reduction/Reoxidation Activated Catalyst A Aqueously Impregnated with Cr(OAc)₃ and Tyzor TE

| Reference Number | Wt. % Ti | Reoxidation Temp. C. | MI² | HLMI/MI | Induction Time (min) | Run Time (min.) | Productivity (g/g) | Color | Pore Volume cm³/g | Surface Area m²/g | Wt. % Cr(VI) |
|---|---|---|---|---|---|---|---|---|---|---|---|
| 1 | 0 | 538 | 0.94(0.93) | 67 | 25 | 60 | 5010 | Light Brown | 1.61 | 302 | 0.34 |
| 2 | 0 | 593 | 0.33(0.33) | 95 | 23 | 70 | 5050 | Tan | — | — | — |
| 3 | 0 | 649 | 0.37(0.37) | 106 | 10 | 50 | 5040 | Tan | — | — | — |
| 4 | 0 | 704 | 0.22(0.21) | 118 | 13 | 54 | 5290 | Tan | — | — | — |
| 5 | 1.07 | 538 | 1.6(2.0) | 65 | 12 | 58 | 4280 | Tan | 1.52 | 290 | 0.39 |
| 6 | 1.07 | 593 | 0.75(0.75) | 86 | 11 | 55 | 5030 | Tan | — | — | — |
| 7 | 1.07 | 649 | 0.56(0.51) | 103 | 10 | 46 | 5430 | Tan/Orange | 1.46 | 293 | — |
| 8 | 1.07 | 704 | 0.30(0.29) | 114 | 10 | 38 | 5210 | Light Orange | 1.38 | 296 | — |
| 9 | 2.95 | 538 | 3.77(4.27) | 63 | 10 | 76 | 4410 | Green/tan | 1.43 | 280 | 0.25 |
| 10 | 2.95 | 593 | 2.63(2.59) | 79 | 10 | 70 | 5070 | Yellow/tan | 1.42 | 285 | — |
| 11 | 2.95 | 649 | 1.42(1.26) | 86 | 10 | 53 | 5640 | Yellow | 1.43 | 284 | — |
| 12 | 4.46 | 538 | 5.6(5.16) | 68 | 10 | 120 | 5210 | Green | 1.31 | 273 | 0.20 |
| 13 | 4.46 | 593 | 5.27(5.18) | 62 | 22 | 94 | 5080 | Yellow/tan | — | — | — |
| 14 | 4.46 | 649 | 1.88(1.66) | 97 | 10 | 54 | 5660 | Green/tan | — | — | — |
| 15 | 4.46 | 704 | 1.96(2.10) | 87 | 13 | 87 | 4660 | Yellow | — | — | — |
| 16 | 6.26 | 538 | 12.0(15.3) | 51 | 49 | 162 | 3920 | Green/yellow | 1.27 | 286 | 0.19 |
| 17 | 6.26 | 593 | 7.35(6.7) | 63 | 10 | 135 | 5480 | Yellow/green | — | — | — |
| 18 | 6.26 | 649 | 2.34(2.35) | 82 | 70 | 153 | 5200 | Yellow | 1.26 | 273 | — |

¹Determined by analysis.
²Corrected to 5000 g/g productivity. Reactor Temp. 104° C.
Values underlined were run at 107° C.
Values in parentheses are uncorrected.

EXAMPLE II

This demonstrates Embodiment 2 of the invention.

A series of catalysts was prepared from a commercially obtained silica hydrogel containing 20 weight percent solids in the manner described below. In each instance, 100 ml of the hydrogel was admixed with The nature of each catalyst is further shown below:

Catalyst 1; control, silica containing sufficient chromium compound to give 1 weight percent chromium in the final calcined catalyst with no surfactant or titanium being employed.

Catalyst 2; invention, silica made by adding triethanolamine titanate added to the hydrogel in an amount sufficient to give 1 weight percent titanium in the final calcined catalyst based on the weight of the dry composite with 3 percent surfactant as a pore preserving agent being employed. No reaction with the water was noted with the titanium compound.

Catalyst 3; invention, silica containing sufficient chromium compound to give 1 weight percent chromium, 3 volume percent surfactant added to the hydrogel, and titanium as triethanolamine titanate added to the hydrogel in an amount sufficient to give 4 weight percent titanium in the final catalyst based on the weight of the final calcined catalyst. No reaction of the titanium compound with the water was noted.

Catalyst 4, invention; silica containing sufficient chromium compound to give 1 weight percent chromium in the final catalyst, 3 volume percent surfactant added to the hydrogel, and triethanolamine titanate added to the hydrogel in an amount sufficient to give 6 weight percent titanium in the final catalyst based on the weight of the final calcined catalyst. No reaction with the water was noted with the titanium compound.

Catalyst 5, control; silica containing sufficient chromium compound to give 1 weight percent chromium in the final calcined catalyst, no surfactant used, titanium tetraisopropoxide added to the hydrogel in an amount sufficient to give 4 weight percent titanium based on the weight of the final calcined catalyst. The titanium compound reacted (hydrolyzed) immediately with the water, precipitating titanium dioxide on the silica and container walls.

Catalyst 6, control; silica containing 0.8 weight percent chromium, based on the final calcined catalyst which was produced by impregnating commercially available silica (Davison 952 silica) with an aqueous solution of chromium (III) acetate and drying.

Catalyst 7, invention: To 715 g of a commercially available silica hydrogel containing 28 weight percent solids was added 300 ml of an aqueous solution containing 7.6 g of chromium III acetate, 96 ml of a commercially available nonionic surfactant, a polyethoxylated sorbitol monolaurate, sold by ICI United States Inc., Atlas Chemicals Div., Wilmington, Del., under the trademark Tween 20. The resulting slurry was dried overnight in a vacuum oven. The final calcined catalyst was calculated to contain about 0.8 weight percent Cr and about 4 weight percent Ti.

Catalysts 6 and 7 were individually activated in a fluidized bed by following the procedure detailed below: (a) Heat in 5/95 volume percent $CO$/nitrogen to 871° C. and hold at that temperature for 4 hours. (b) Reduce temperature to 538° C. in an atmosphere of 100 percent nitrogen. (c) Replace the nitrogen with dry air and hold in dry air at 538° C. for 2 hours, then recover and store in a dry atmosphere until ready for use.

A sample of each activated catalyst was employed in ethylene particle form polymerization at 107° C., unless specified otherwise, using isobutane as diluent as known in the art. A normal reactor pressure of 550 psia (3.9 MPa) was used. Each run was conducted sufficiently long to produce about 5000 g polymer per g catalyst. Each product was recovered at the end of the run by flashing off diluent and ethylene and removing the polymer which was dried and weighed to determine the actual yield. The melt index (MI) and high load melt index (HLMI) was determined for each resin sample in accordance with ASTM Procedure D 1238-65T, Condition E and F, respectively. From the melt index values, the HLMI/MI ratios were calculated to obtain a measure of the molecular weight distribution of the polymer. Each MI value was corrected to a common productivity level of 5000 g polymer per g catalyst so that a valid comparison of the values could be made as is known in the art. The catalyst weights employed and results obtained are given in Table V.

TABLE V

Ethylene Polymerization, 107° C., 3.9 MPa
Aqueous Titanation Of Hydrogel

| Run No. | Catalyst Wt. g | Catalyst Wt. % Ti | Polymer Yield g | Productivity g polymer/g cat. | Melt Index | Percent Calculated Melt Index Improvement | HLMI MI | Remarks |
|---|---|---|---|---|---|---|---|---|
| 1 | 0.0460 | 0 | 248 | 5390 | 0.34 | —[a] | 90 | control |
| 2 | .0740 | 2 | 356 | 4810 | 0.39 | 15[b] | 79 | invention |
| 3 | .0920 | 4 | 405 | 4400 | 0.62 | 82[b] | 72 | invention |
| 4 | .0715 | 6 | 352 | 4920 | 0.63 | 85[b] | 78 | invention |
| 5 | .0930 | 4[c] | dead | — | — | — | — | control |
| 6[d] | .0365 | 0 | 183 | 5010 | 0.94 | — | 67 | control |
| 7[d] | .0479 | 4 | 240 | 5010 | 5.8 | 517[e] | 65 | invention |

[a] A dash signifies no entry is needed.
[b] Based on melt index of control run 1 for runs 2–4.
[c] Based on prior experience, had this catalyst been active; the melt index of the polymer obtained therewith would be expected to be similar to that of control run 1.
[d] Reactor temperature was 104° C.
[e] Based on melt index of control run 6 for run 7.

The results presented in Table V in invention runs 2–4 show that triethanolamine titanate can be added to a silica hydrogel containing a water soluble chromium compound plus a nonionic surfactant, the mixture can be dried in an air oven and the product can be conventionally activated with dry air or sequentially in $CO/N_2$, then dry air, at an elevated temperature to produce active ethylene polymerization catalysts having enhanced melt index capability compared to control catalysts. The results suggest that a titanium level, calculated as the metal, of about 4 weight percent is sufficient to improve the melt index capability of silica-chromium oxide catalyst as exemplified in control run 1 by at least about 80 percent. A higher titanium level affords little improvement in melt index capability, a lower level, specifically 2- weight percent titanium, gives a catalyst having about a 15 percent improvement in melt index capability.

The poor results of control run 5 utilizing a catalyst containing titanium derived from a water sensitive titanium compound (titanium tetraisopropoxide) shows that titanium of silica hydrogels requires a hydrolysis-resistant titanium compound if an active polymerization catalyst is desired. Otherwise, the precipitated titania forms a mixture with the silica that at best is no better than silica alone as a component of the silica-chromium oxide catalyst.

The fractional melt index polymers produced with invention catalysts 2–4 as prepared in this example are expected to be of value in blow molding, extrusion, etc. since the articles would have good environmental stress cracking resistance. Copolymerizing a minor amount of 1-butene or 1-hexane with the ethylene, e.g., about 10 mole percent, in the presence of the catalysts would yield fractional melt index copolymers having even better stress cracking resistance than the homopolymers.

Invention catalyst 7 demonstrates that relatively high melt index ethylene polymers can be produced when the catalyst is activated sequentially in a carbon monoxide ambient then an air ambient. About a five-fold increase (517 percent) in melt index capability over control catalyst 6 is shown. The results also demonstrate in run 7 that the nonionic surfactant employed is equivalent to the silicone based surfactant employed in runs 2–4, in producing active catalysts.

While this invention has been described in detail for the purpose of illustration, it is not to be construed as limited thereby but is intended to cover all changes and modifications within the spirit and scope thereof.

I claim:

1. A polymerization process comprising contacting at least one mono-1-olefin having 2 to 8 carbon atoms per molecule with a chromium-containing catalyst produced by impregnating a dry silica xerogel, formed by drying a silica hydrogel, with an aqueous solution of a water soluble hydrolysis resistant titanium compound.

2. A method according to claim 1 wherein said olefin is selected from ethylene, propylene, 1-butene, and 1-hexene.

3. A method according to claim 2 wherein said olefin is predominantly ethylene.

4. A method according to claim 3 wherein said polymerization is carried out at a temperature within the range of 66° to 110° C.

5. A method according to claim 1 wherein said silica is made by adding an alkali metal silicate to an acid to form a hydrogel, washing the hydrogel with water, impregnating the thus washed hydrogel with an aqueous solution of a chromium compound selected from CrO3 and chromium acetate and spray drying.

6. A method according to claim 5 wherein said hydrolysis resistant titanium compound is a titanium chelate having the formula where R is an alkyl group containing from 1 to about 4 carbon atoms, A is a functional group containing O or N or is OH, and B is a divalent hydrocarbon chain of 2 or 3 carbon atoms which can have one or more alkyl groups of 1 to about 4 carbon atoms.

7. A method according to claim 6 where said hydrolysis resistant titanium compound is lactic acid titanium chelate.

8. A method according to claim 6 wherein said hydrolysis resistant compound is tetraoctylene glycol titanium chelate.

9. A method according to claim 6 wherein said hydrolysis resistant compound is triethanolamine titanate.

10. A method according to claim 6 wherein said catalyst is activated by reduction and reoxidation.

11. A method according to claim 9 wherein the titanium-impregnated chromium-containing catalyst is dried and thereafter activated in air at a temperature within the range of 400° to 1100° C., and wherein said catalyst contains from about 0.5 to about 4 weight percent chromium and 2 to 6 weight percent titanium based on the weight of the activated catalyst.

12. A polymerization process comprising contacting at least one mono-1-olefin having 2 to 8 carbon atoms per molecule with a chromium-containing catalyst produced by forming a silica hydrogel containing a water soluble hydrolysis resistant titanium compound, and drying said hydrogel to form a xerogel.

13. A method according to claim 12 wherein said olefin is selected from ethylene, propylene, 1-butene, and 1-hexene.

14. A method according to claim 13 wherein said olefin is predominantly ethylene.

15. A method according to claim 14 wherein said polymerization is carried out at a temperature within the range of 66° to 110° C.

16. A method according to claim 15 wherein said chromium is added as an aqueous solution of a chromium compound to said hydrogel.

17. A method according to claim 16 wherein said chromium compound is selected from CrO3 and chromium acetate.

18. A method according to claim 17 wherein said hydrogel is formed by adding an alkali metal silicate to an acid.

19. A method according to claim 18 wherein said hydrogel is spray dried and said hydrolysis resistant titanium compound is incorporated into said hydrogel by adding it to the hydrogel after the hydrogel is formed.

20. A method according to claim 19 wherein said hydrolysis resistant titanium compound is a titanium chelate having the formula where R is an alkyl group containing from 1 to about 4 carbon atoms, A is a functional group containing O or N or is OH, and B is a divalent hydrocarbon chain of 2 or 3 carbon atoms which can have one or more alkyl groups of 1 to about 4 carbon atoms.

21. A method according to claim 20 wherein said hydrolysis resistant titanium compound is triethanolamine titanate.

22. A method according to claim 20 wherein said hydrolysis resistant titanium chelate compound is lactic acid titanium chelate.

23. A method according to claim 20 wherein said hydrolysis resistant titanium compound is tetraoctylene glycol titanium chelate.

24. A method according to claim 20 wherein said catalyst is activated by reduction and reoxidation.

25. A method according to claim 21 wherein said catalyst is activated in air at a temperature within the range of 400° to 1100° C. and wherein the thus-activated catalyst contains chromium in an amount within the range of 0.5 to 4 weight percent and titanium in an amount within the range of 2 to 6 weight percent based on the weight of the activated catalyst.

26. A polymerization process comprising contacting at least one mono-1-olefin having 2 to 8 carbon atoms with a chromium-containing catalyst produced by forming a silica hydrogel containing a water soluble hydrolysis resistant titanium compound, and drying said hydrogel to form a xerogel, wherein said hydrogel contains in addition a pore preserving agent selected from organic silicon compounds, oxygen-containing organic compounds, acids, and surfactants.

27. A method according to claim 26 wherein said olefin is selected from ethylene, propylene, 1-butene, and 1-hexene.

28. A method according to claim 27 wherein said olefin is predominantly ethylene.

29. A method according to claim 28 wherein said polymerization is carried out at a temperature within the range of 66° to 110° C.

30. A method according to claim 26 wherein said hydrogel is washed with water and subsequent to said washing said pore preserving agent is added to the thus-washed hydrogel.

31. A method according to claim 30 wherein said chromium is added as an aqueous solution of a chromium compound to said hydrogel.

32. A method according to claim 31 wherein said chromium compound is selected from $CrO_3$ and chromium acetate.

33. A method according to claim 32 wherein said hydrogel is formed by adding an alkali metal silicate to an acid.

34. A method according to claim 33 wherein said hydrogel is dried by spray drying.

35. A method according to claim 34 wherein said hydrolysis resistant titanium compound is selected from a titanium chelate having the formula wherein R is an alkyl group containing from 1 to about 4 carbon atoms, A is a functional group containing O or N or is OH, and B is a divalent hydrocarbon chain of 2 or 3 carbon atoms which can have one or more alkyl groups of 1 to about 4 carbon atoms.

36. A method according to claim 35 wherein said hydrolysis resistant titanium compound is triethanolamine titanate.

37. A method according to claim 35 wherein said hydrolysis resistant titanium compound is lactic acid titanium chelate.

38. A method according to claim 35 wherein said hydrolysis resistant titanium compound is tetraoctylene glycol titanium chelate.

39. A method according to claim 35 wherein said catalyst is activated by reduction and reoxidation.

40. A method according to claim 36 wherein said pore preserving agent is selected from a polysiloxane-polyoxyalkylene copolymer, a polyethoxylated sorbitol monolaurate, a polyethoxylated t-octylphenol.

* * * * *